Aug. 16, 1927.　　　　　W. T. HENSLEY　　　　　1,639,505
PULLEY
Filed Feb. 27, 1925　　　2 Sheets-Sheet 1
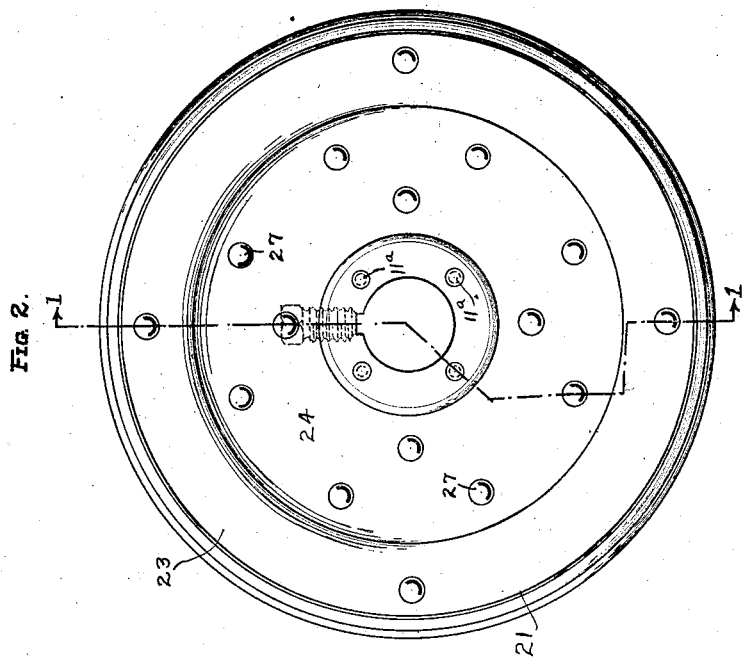
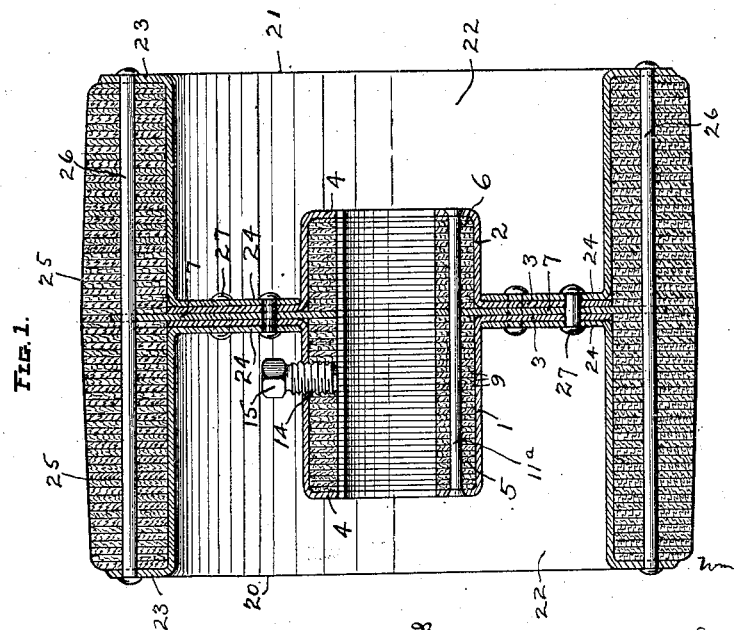
Inventor
Wm T. Hensley
By
Lloyd L. Evans
Attorney Aug. 16, 1927.
W. T. HENSLEY
1,639,505
PULLEY
Filed Feb. 27, 1925   2 Sheets-Sheet 2
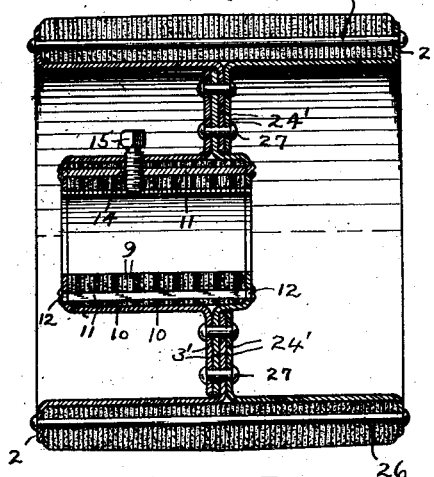
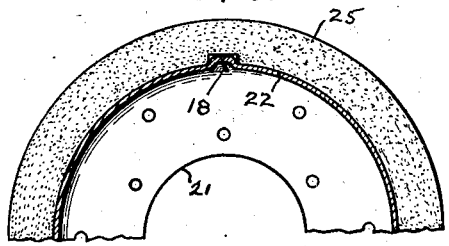
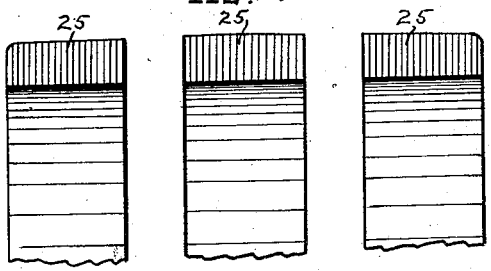
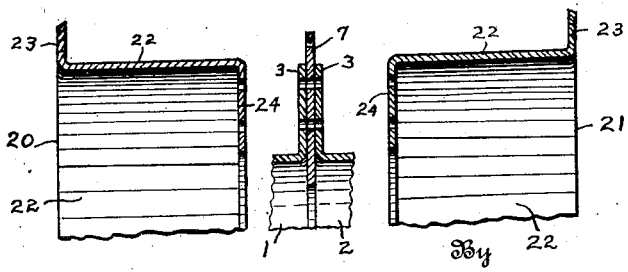
Inventor
Wm T. Hensley
By Lloyd L. Evans
Attorney Patented Aug. 16, 1927.

1,639,505

UNITED STATES PATENT OFFICE.

WILLIAM T. HENSLEY, OF INDIANAPOLIS, INDIANA.

PULLEY.

Application filed February 27, 1925. Serial No. 12,163.

This invention relates to relatively large, laminated pulleys, that is pulleys of sufficient diameter so that it is preferable to have rim and hub portions with an intervening web portion.

An object of the invention is to provide a pulley of such structure that separate hub units, end plates, and annular pulley face units of different dimensions can be made for stock, from which pulleys of a great range of size and dimension may be expeditiously produced with a relatively small amount of additional labor and expense.

Another object of the present invention is to provide a relatively light pulley having a body provided with a relatively dense hub possessing great durability and mechanical strength, and with a laminated rim portion possessing the requisite mechanical strength, but having to a high degree the frictional qualities desirable in frictional power transmission elements.

A further object of the invention is to provide a pulley of the type above described in which the parts can be economically manufactured and in which the parts can be quickly and easily assembled to form the complete pulley.

Another object is to provide a pulley having a body comprising parts adapted to be secured together in a plane normal to the axis of the pulley and to contain a laminated rim and hub portion.

A further object of my invention is to provide a pulley in which the laminated rim is supported over its entire inner periphery by an end member of relatively light weight and inexpensive structure.

With the above and other objects in view, the invention may be said to comprise the structure as illustrated in the accompanying drawings, fully set forth in the following description and specifically described in the appended claims, together with such variations and modifications thereof as will be obvious to those skilled in the art to which the invention appertains.

Reference should be had to the accompanying drawings forming a part of this specification, in which Figure 1 is a longitudinal section on line 1—1, Fig. 2.

Fig. 2 is an end elevation of the assembled pulley.

Fig. 3 is a longitudinal section through a modified form of assembled pulley.

Fig. 4 is a fragmentary longitudinal section through the rim parts of another modified form of pulley.

Fig. 5 is a view on line 5—5, Fig. 4.

Fig. 6 is a fragmentary sectional view through a hub construction.

Fig. 7 is a fragmentary sectional view through another form of hub construction.

Fig. 8 is a fragmentary sectional view showing the rim sections and end plates disassembled.

The pulley shown in the accompanying drawings, which is constructed in accordance with my invention, preferably comprises a completely assembled hub unit, which may be used in conjunction with a suitable rim unit or with an assembly of semi-completed rim elements in order to expeditiously form a pulley of the desired size or character from a minimum variety of sizes of rim and hub units with a minimum addition of labor.

The hub portion is preferably formed of a pair of opposed sheet metal hub cups 1 and 2, each of which has a web portion 3 and an inwardly extending end flange 4 which together encase the hub core or bushing that is preferably formed of portions 5 and 6. An intermediate plate 7 is preferably interposed between the web portions 3 of the hub cups 1 and 2, and it may extend beyond the web portions 3 into the rim unit to engage the transverse rivets therein used or other securing means to thus insure strong driving relation between the hub member and the rim. The sheet metal hub cups 1 and 2 are preferably of drawn sheet steel or other relatively strong, light weight and inexpensive material. The web portions 3 of the hub cups preferably extend substantially to the rim of the pulley, although this is not essential, and such portions may terminate at any desired intermediate diameter. The inwardly extending flanged portions 4 of the hub cups are substantially of the bore of the hub. The hub core or bushing portions 5 and 6 may be of any suitable material that gives the requisite strength and rigidity to the hub of the pulley. They are preferably formed of a laminated fibrous structure 9 with or without interposed metal core plates 10, as indicated in Figs. 3, 6 and 7.

The entire hub structure may be rigidly held in assembled relation by cylindrical rivets, indicated at 11ª in Figs. 1 and 2, or by means of flat rivets 11 which may have shouldered end portions having tongues 12 extending therefrom which may be suitably upset to rigidly secure the hub structure in an assembled unit.

By the use of such shouldered rivets, the length of the hub core may be more easily controlled, as the hub cups 1 and 2 may be pressed together until they seat on the rivet shoulders and the rivets then headed over. Such shouldered hub rivets also provide a hub assembly of great strength, all of the parts of which are held in rigid assembled relation independently of the core or bushing material.

Whichever character of rivets to secure the hub-members together is preferred may be used, the object being to maintain the core unit in rigid assembled condition in order that it may be kept in stock as a unit which may be subsequently assembled with semi-manufactured rim units in order to form pulleys of different dimensions and characteristics.

The hub portion of the pulley is provided with the screw threaded aperture 14 which extends radially of the core portion of the hub and is adapted to receive a suitable set screw 15 to engage the key on the shaft (not shown) to which the pulley is applied. If flat rivets 11 are used, it is preferable to dispose one of the rivets so that the aperture 14 passes through the rivet, as shown in Fig. 3, and thus a threaded aperture is formed in solid metal for receiving the set screw.

The rim portion of the pulley with which the previously described hub portion is adapted to be assembled, comprises a pair of end plates 20 and 21, each of which has a circumferential rim supporting portion 22, an outwardly extending end flange 23 that is adapted to overlie the material from which the pulley face is formed, and an inwardly extending radial disc or web portion 24 which is adapted to be united with the web portions 3 of the hub member to form the web of the completed pulley structure. Attention is particularly directed to the overlapping of web portions 3 and 24 which together provide a web assembly of the pulley embodying a portion that is integral with the rim supporting portion and a second portion overlying the first named web portion which is integral with the hub cap of the pulley. The various advantages of this structure will later be set forth in more detail.

A plurality of annular rim units 25 are indicated in Fig. 8 which shows a view of the parts to be assembled to form the web and rim of the pulley shown in Fig. 1. These units are assembled between the end plates 20 and 21 to form the driving face of the pulley. These annular rim units may be of any suitable pulley facing material and of any desired size, the object being to provide completely formed units which may be assembled in various relations to provide facing material for pulleys of various widths and diameters. In the present structure, I prefer that the material of the pulley face be of fibrous structure, either laminated or otherwise formed. Such material has very desirable practical characteristics and is very durable when supported by end plate portions 22. Laminated bodies of this general form may preferably be constructed in accordance with the disclosure of my co-pending application, Serial No. 10,798, filed February 21, 1925. When constructed in accordance with the winding apparatus disclosed in said application, the outer face of the units will be of less density than the inner portions and consequently a softer frictional surface for driving and a denser portion for holding the securing means is thereby obtained.

The annular rim units 25 may be rigidly held in position between the end plates 20 and 21 by means of transverse rim rivets 26, shown in Fig. 1, which extend between the opposed flanges 23. These rivets are preferably round rivets of relatively small diameter extending substantially through the central zone of the facing material in order that the material of the pulley face will not be weakened by unnecessarily large apertures formed therein for the purpose of receiving such rivets.

The end plates 20 and 21 have their web portions 24 in engagement with the web portion 3 of the hub members 1 and 2, to which they are secured by suitable web rivets or other means. For certain assemblies, it may be desirable to secure this assembly of plates together by spot welding such plates or by other convenient methods of securing them in assembled relation.

It will be seen from the preceding description that complete hub assemblies comprising the hub cups 1 and 2, which are held in assembled relation by means of transverse rivets and which include therebetween the core or bushing portions of the pulley, may be kept in stock for use in making up pulleys in response to the immediate requirements of the manufacturer. When a definite size and type of pulley is required, suitable end portions 20 and 21 are selected for the particular type of pulley to be formed, and one or more completed annular rim units are placed between the end portions 20 and 21, and such portions are preferably arranged in superposed or alternated relation with the web portion 3 of the hub unit. The end plates 20 and 21 are then compressed to assembled relation with the desired number of annular rim units and transverse rivets 26 are employed to secure the asesmbled mass into a unitary body. The web rivets 27 are used to secure the web portions 3 rigidly together.

As a modification of this invention, completely assembled rim units may also be formed which correspond more closely to the assembled hub units previously described. The end plates 20 and 21 for this purpose may be assembled to include annular rim units 25 which are secured in assembled relation by suitable rim rivets 26. A unit of this type may then be used with any desired hub unit, such as those shown in Fig. 6 or Fig. 7.

Such a rim unit assembled with the hub unit is shown in Fig. 3, and in this instance the webs 24' of the rim unit are placed along the side of the webs 3' of the hub unit.

In Fig. 7 is shown a modified form of hub construction in which only a cup 1 is used and an end plate is used therewith to close the other end of the hub after the laminations have been inserted. The cup 1 is provided with the web member 3' as usual and the plate 16 forms the co-operating web flange 3''.

If it becomes necessary to effect a driving relation between the rim units 25 and the end plates 20, 21, this may be accomplished by striking up ribs 18 from the portion 22 of the end plates to engage the inner periphery of the units 25. It will be obvious that such ribs 18 may be separate members welded or otherwise secured to the outer surfaces of the portions 22 of the end plates, or otherwise provided in any suitable manner to form a driving relation with the rim units, and in this construction the end plates are held together by the usual rivets 27 which may be inserted through the web members.

It will thus be seen that with this construction, a relatively large number of pulleys with various widths of face, various lengths of hub and various diameters of bore may be expeditiously assembled from a relatively small number of substantially standard, semi-manufactured units, such final assembly into complete pulley structures requiring very little additional labor. For example, the hub member may be assembed with the intermediate plate and web portion at the desired location and it may be provided with a bore of minimum diameter. This unit may then be adapted for pulleys of a great many lengths of face and a great many bore diameters, for the bore can be suitably finished to a large number of greater diameters. It will also be seen that the hub member thus assembled may be centrally located with respect to the web or may be offset axially thereto, as shown in Fig. 1.

Particular attention is also invited to the particular mechanical advantages of a finished pulley structure of the type herein shown. The laminated hub portion may be of any desired relative density as compared with the power transmitting rim portion of the pulley. The interposed core plates provide a pulley hub unit of great strength, of light weight and inexpensive structure, whereas the use of a supported fibrous facing for the pulley also greatly reduces the weight of the pulley and provides a driving face having great strength and maximum frictional characteristics. Particular attention should also be given to the fact that the material of the driving face is completely enclosed on three sides by the co-operating side flanges of the end plates which extend radially substantially to the driving face of the pulley. The cylindrical portions 22 of the end plates underlie the surfacing material of the pulley and thereby greatly increase the strength of the pulley face without materially increasing its weight. The web portion of the pulley is thus formed of engaging plates, certain of which are integral with the end plates and certain other of which are integral with the hub members.

Although I have shown a laminated rim and prefer that such a rim be used, it is obvious that the construction of the pulley herein described lends itself to the use of any type of rim material that may be desired, including various substances, such as paper pulp, rubber composition or the like, which may be molded into annular rim units to be used in the assembly of the pulley. Or a simple pulley face of metal or other material could be used in lieu of the fibrous or molded rim material and secured in any suitable manner to the cylindrical portions 22 of the end plates.

Furthermore, it is to be understood that the particular forms of apparatus shown and described, and the particular procedure set forth, are presented for the purposes of explanation and illustration and that various modifications of said apparatus and procedure can be made without departing from my invention as defined in the appended claims.

What I claim is:

1. A pulley comprising a pair of opposing hub members of relatively light metal having cup-shaped hub portions, a hub core of light material secured to said members, webs projecting outwardly from said members, and a pair of end plates having opposing inner web portions adapted to engage and be secured to said hub web portion to complete the pulley web, said end plates being axially outturned to receive and support a relatively light pulley rim face and being radially outturned to form flanges that overlie and support the ends of the pulley rim, and means to secure said web portions together and to secure said rim between the end plates.

2. The invention specified in claim 1 in which the opposing web portions of the end plates and the hub members are co-extensive.

3. A pulley consisting of a hub unit comprising a pair of opposing hub members having cup-shaped hub portions, a relatively light hub core of such diameter that it may be machined out in order to be fitted to a plurality of sizes of shafts arranged in said portions, said hub members having suitable outer web portions, and a relatively light rim unit comprising a pair of end plates carrying a pulley rim and having inner web portions adapted to engage said hub web portions, and means to secure said hub unit and rim unit together.

4. The invention specified in claim 3 in which the hub members are of relatively light metal and the hub core is laminated.

5. The invention specified in claim 3 in which the web portions of the hub unit and rim unit are co-extensive.

6. A unit for use in the manufacture of completed driving pulleys, comprising a pair of hub cups having radially extending web flanges and inwardly extending radial end caps, a filling material introduced between the end caps and permanently secured therein by means of transverse rivets extending between the end cap portions of the hub cups.

7. A hub unit for use in the assembly of a driving pulley structure, comprising a pair of opposed hub cups each having a radially extending web portion, a core member enclosed therebetween, and separate means for permanently securing said hub caps and core member in assembled relation.

8. A completely assembled hub unit for use in the assembly of a pulley structure, comprising two sheet metal members having portions thereof spaced to form a core received space between them and other portions arranged adjacent to each other to form a radially extending securing member for attachment to a rim unit, laminated filling material arranged between said spaced portions, and rivets extending through said portions and said material to hold said members and material in assembled relation.

9. A completely formed rim unit designed for attachment to a hub unit comprising two sheet metal members having portions spaced apart to form a core receiving space between them, and other portions projecting inwardly to form webs for attachment to said hub unit and provided with an opening of sufficient size to permit a portion of said hub unit to be inserted laterally in said opening, a laminated core arranged between said spaced portions and rivets traversing said last named portions and said core to secure said members and core together.

10. A rim unit to be used as an article of merchandise for use in the assembly of a completed driving pulley structure, comprising a pair of opposed end plates each having an inwardly extending web portion adapted to constitute a portion of the web of a pulley structure, a cylindrical pulley face supporting portion having a transverse ridge formed thereon and outwardly extending flange portions, and pulley facing material having a key way adapted to receive said ridge held in compacted condition between said end flanges, said end plates being permanently secured together in assembled relation.

In testimony whereof, I hereunto affix my signature.

WILLIAM T. HENSLEY.